(12) United States Patent
Olaru et al.

(10) Patent No.: US 6,887,418 B2
(45) Date of Patent: May 3, 2005

(54) POST MOLD COOLING OF PREFORMS (75) Inventors: George Olaru, Toronto (CA); Robert Sicilia, Etobicoke (CA)

(73) Assignee: Mold-Masters Limited, Georgetown (CA)

( * ) Notice: Subject to any disclaimer, the term of this patent is extended or adjusted under 35 U.S.C. 154(b) by 240 days.

(21) Appl. No.: 10/279,024

(22) Filed: Oct. 24, 2002

(65) Prior Publication Data
US 2003/0107155 A1 Jun. 12, 2003

Related U.S. Application Data
(60) Provisional application No. 60/330,541, filed on Oct. 24, 2001.

(51) Int. Cl.[7] ........................... B29C 45/72; B29C 45/42
(52) U.S. Cl. .................... 264/328.1; 264/334; 264/527; 425/577; 425/533; 425/544
(58) Field of Search ............................. 264/328.1, 334, 264/537; 425/577, 444, 533, 534

(56) References Cited

U.S. PATENT DOCUMENTS

| | | | |
|---|---|---|---|
| 4,351,631 A | * | 9/1982 | Gessner et al. ............. 425/533 |
| 4,405,556 A | * | 9/1983 | Valyi ........................... 264/513 |
| 4,473,515 A | | 9/1984 | Ryder |
| 4,592,719 A | | 6/1986 | Bellehache et al. |
| 5,501,593 A | | 3/1996 | Marcus |
| 6,095,788 A | | 8/2000 | van Manen et al. |
| 6,139,789 A | | 10/2000 | Neter et al. |
| 6,223,541 B1 | | 5/2001 | Farrag |
| 6,296,473 B1 | | 10/2001 | Ohlmann |

FOREIGN PATENT DOCUMENTS

| | | |
|---|---|---|
| EP | 0 937 566 | 8/1999 |
| EP | 950496 | * 10/1999 |
| WO | WO 00/29193 | 5/2000 |

* cited by examiner

Primary Examiner—Jill L. Heitbrink
(74) Attorney, Agent, or Firm—Sterne, Kessler, Goldstein & Fox P.L.L.C.

(57) ABSTRACT

Post-mold cooling of injection molded plastic articles such as preforms is achieved by transferring the articles directly from the mold cavities onto cooling cores carried by a take-out plate. The molded articles are supported on the cooling cores until they become sufficiently frozen that they can be stripped from the cores.

14 Claims, 12 Drawing Sheets

POST MOLD COOLING OF PREFORMS

CROSS-REFERENCE TO RELATED APPLICATIONS

This application claims benefits from U.S. provisional application Ser. No. 60/330,541 filed Oct. 24, 2001 which is incorporated herein by reference in its entirety.

FIELD OF THE INVENTION

This invention relates generally to the plastic molding art. More particularly (though not exclusively) the invention is concerned with the manufacture of relatively large blow molded hollow articles such as bottles for carbonated drinks.

BACKGROUND OF THE INVENTION

Bottles for carbonated drinks typically are made in a wide variety of sizes, including quite large sizes (e.g. 2 litre capacity). These bottles are required to meet rigorous testing standards to guard against the possibility that a bottle might leak or burst in use. The bottles are required to withstand severe, extraordinary mechanical impacts without leaking.

In order to ensure that the finished bottles meet the required standards, close attention is paid to the bottle manufacturing process. One expedient that is adopted is to make the finished bottle via an intermediate product known as a "preform". Preforms are essentially elongate plastic tubes that are closed at one end and formed with a thread and collar at the opposite end that will become the neck of the bottle. The body of the preform is much shorter and of much less diameter than the eventual bottle and is usually reheated and then blow-molded to the final bottle shape and size.

Preforms typically are made by injection molding and are designed to have a molecular structure that results in the final bottle having the required strength characteristics. Attention must also be paid to the clarity of the plastic material of the preform, to ensure that the eventual bottle has the required visual characteristics. For example, the plastic material must not be allowed to crystallize, otherwise the preform will be "cloudy" and the quality of the eventual bottle will be impaired. Rapid post-mold cooling of the preforms is essential if the objective is to be met. Rapid cooling is also important in terms of cycle time and therefore productivity of the overall molding process.

DESCRIPTION OF THE PRIOR ART

Injection and injection blow-molding of the preforms is well known technology and numerous proposals to speed up the cycle time are disclosed in the technical and patent literature. As noted previously, a key issue is the handling and temperature conditioning of the molded preforms. Reduced injection molding cycle times may result in soft preforms in which the plastic material may also crystallize and become cloudy.

A typical injection molding machine includes a mold comprising a mold cavity part having an array of cavities for defining the exterior of the articles to be molded, and a mold core part having corresponding cores that are received in the mold cavities when the mold parts are closed, for defining the interior of the molded articles. A number of prior art solutions to the problem of reducing cycle time involve retaining the molded preforms on the molding cores after the cores have been removed from the mold cavities and internally cooling the cores. A disadvantage of this approach is that the molding apparatus must have several sets of mold cores so that a set can be used for molding while one or more other sets are used for cooling. Each core must also have associated "neck rings" that form the threaded neck portion of the preform. In other words, specialized molds and specialized injection molding machines are required.

The best known examples of this type of injection molding machine are known as the "shuttle mold" or the "turret" or "index type" machine.

The shuttle mold approach requires a mold core part that has twice as many mold cores as mold cavities. This approach is disclosed in several patents including U.S. Pat. No. 4,473,515 (Ryder), U.S. Pat. No. 5,501,593 (Marcus) and U.S. Pat. No. 6,095,788 (Manen).

Turret or index type injection molding machines use a rotary block that in most cases has four faces provided with respective mold core plates in different planes. The block is indexed about an axis perpendicular to the axis of injection to bring different core plates into the molding position, while other core plates are exposed to the air for cooling of preforms carried by those cores.

Another approach is to transfer the molded preforms directly from the mold cores onto a take-out plate having cooling tubes for post mold cooling. Examples of this approach are disclosed in U.S. Pat. No. 4,592,719 (Bellenhache) and in WO 00/29193 and EP 937566 (both to Biraghi).

SUMMARY OF THE INVENTION

An object of the present invention is to provide an injection molding method and apparatus that provides for improved post-mold cooling of preforms or other injection molded articles.

In one aspect, the method of the invention comprises the steps of:

a) providing a molding system comprising a mold cavity plate having a plurality of injection cavities, and a mold core plate having a corresponding plurality of injection cores receivable in the cavities for forming a plurality of molded articles;

b) with the mold plates in a closed position, injecting plastic material into the mold cavities to form the molded articles;

(c) separating the mold plates while retaining the molded articles in the injection cavities;

(d) providing a take-out plate having retaining cores;

(e) positioning the take-out plate between the cavity plate and the core plate;

(f) transferring the molded articles directly from the cavities onto the retaining cores; and, (g) cooling the molded articles on said retaining cores.

While the molded articles may be allowed to cool passively on the retaining cores, the articles preferably are cooled actively, for example, by means of cooling fluid jets that are directed internally and/or externally onto the molded articles. Typically, the retaining cores will incorporate passageways for internal cooling of the molded articles.

The mold plates themselves may be designed to permit partial cooling of the molded articles while they are still in the mold, i.e. before the articles are transferred to the cooling cores.

In prior art approaches in which the freshly molded articles are cooled on a take-out plate having tubes, it can be difficult to provide proper support for the molded articles and ensure that they do not sag against the walls of the tube while the articles are in only a partially frozen condition.

According to the present invention, the molded articles are retained in the mold cavities and then transferred directly to a take-out plate having cooling cores. Supporting the molded articles on cooling cores avoids sagging of preforms. The cooling cores can be configured identically or very similarly to the mold cores.

In another aspect, the invention provides an apparatus that includes a mold comprising a mold cavity plate having a plurality of injection cavities and a mold core plate having a corresponding plurality of injection cores receivable in the cavities for forming a plurality of articles. The mold plates are movable between open and closed positions and the apparatus further includes a take-out plate including a plurality of retaining cores corresponding to said plurality of cavities, and means for transferring molded articles from said cavities directly to said cores.

Preferably, the apparatus includes cooling means located on the take-out plate, for example, means for delivering cooling air internally and/or externally to said molded articles.

The retaining cores may correspond in number and position to the number and position of the cavities in the mold cavity plate so that the retaining cores can be inserted directly into the mold cavities for transfer of molded articles onto the cores. Alternatively, the number and configuration of retaining cores can be different from the number and/or configuration of mold cavities, in which case it will be necessary to completely remove the molded articles from the mold cavities and transfer them onto the retaining cores.

The word "plate" as used herein in referring to a mold cavity plate, a mold core plate and a take-out plate represents commonly accepted terminology in the art and, where appropriate, is to be interpreted broadly as including structure that may be more complex than a simple flat plate.

BRIEF DESCRIPTION OF THE DRAWINGS

In order that the invention may be more clearly understood, reference will now be made to the accompanying drawings which illustrate schematically a number of preferred embodiments of the invention by way of example, and in which.

DETAILED DESCRIPTION OF THE INVENTION

Figure 1:
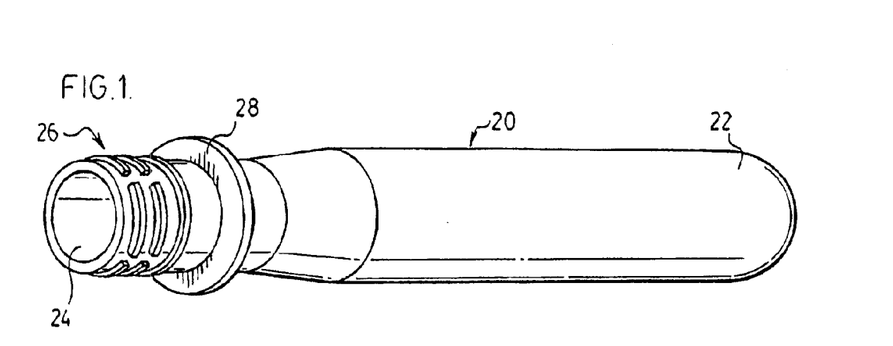
FIG. 1 is a perspective view of a typical bottle preform that may be manufactured in accordance with the present invention.

Referring first to FIG. 1, an injection molded bottle preform is denoted by reference numeral 20 and has a generally cylindrical overall shape with a closed outer end 22 and an open inner end 24. The portion of the preform adjacent end 24 will form the neck of the bottle to be made from the preform and includes a cylindrical threaded section 26 and an annular flange 28.

Figure 2:
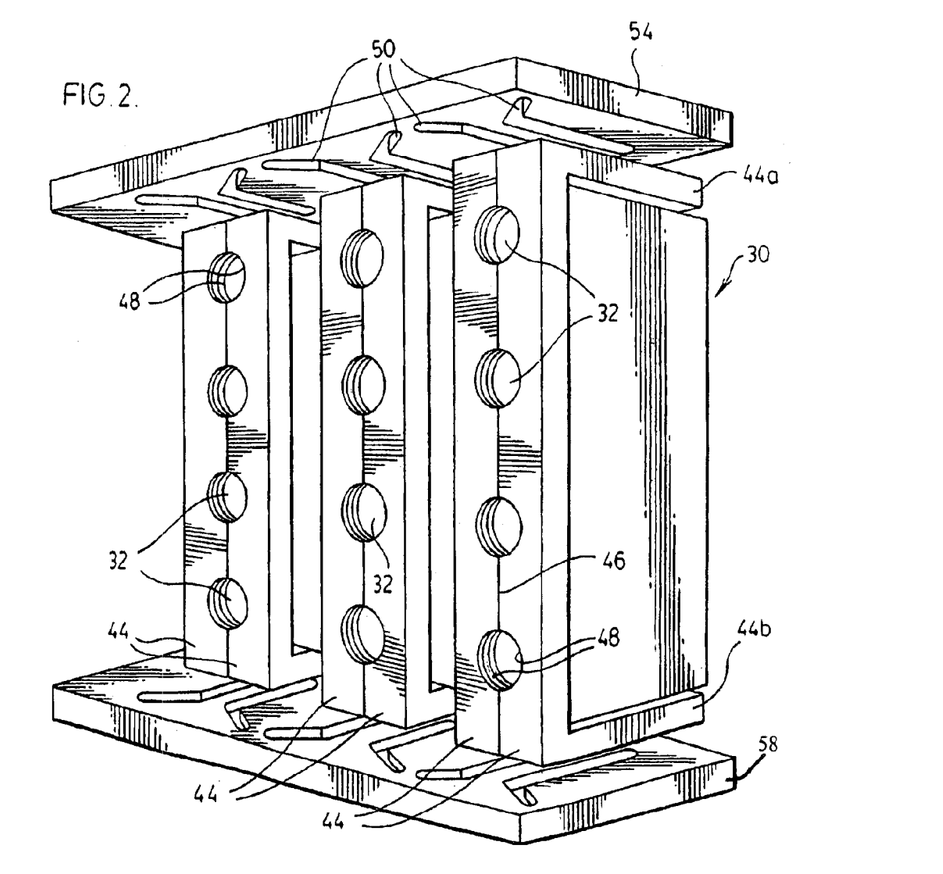
FIG. 2 is a perspective view of the cavity mold plate of an injection molding apparatus in accordance with the invention.

FIGS. 2 to 6 schematically illustrate the principal components of a molding system for making multiple preforms 20 in batches. For purposes of illustration, the drawings show a system for making batches of 12 preforms; in practice, the apparatus will be designed to make much larger batches, as is conventional in the art. FIG. 2 shows the cavity plate of the mold, generally at 30. Open inner ends of the mold cavities (arranged in vertical rows) are visible at 32. A conventional hot runner system for delivering molten plastic material to the mold cavities is indicated at 34 in FIG. 6.

Figure 4:
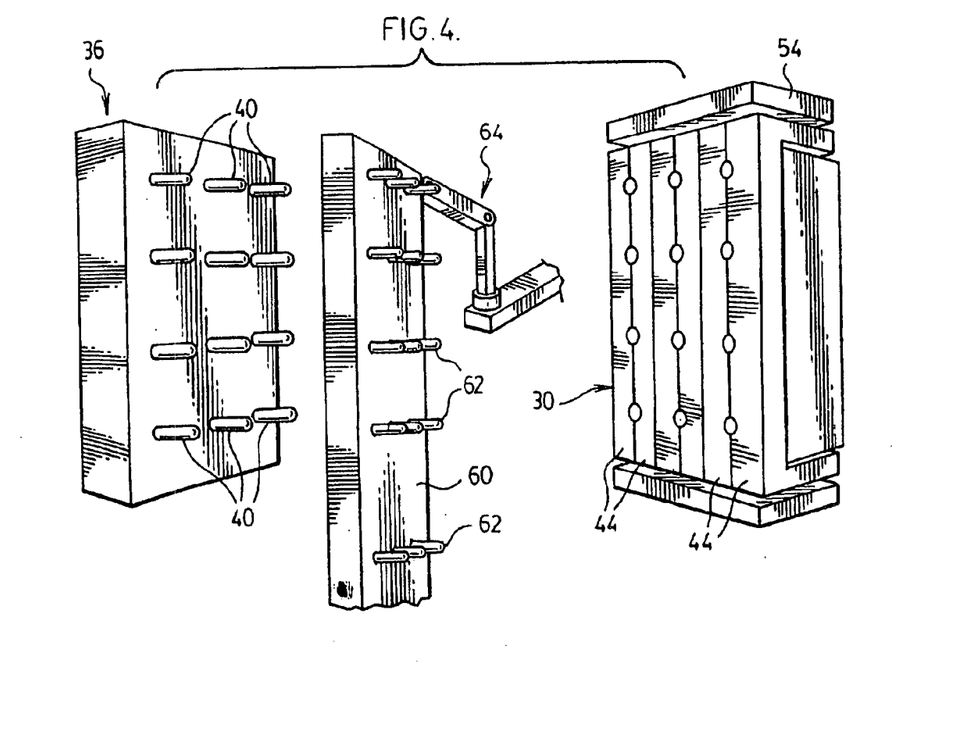
FIG. 4 is a perspective view showing the mold plates in an open position with a take-out plate interposed between the mold plates for removing molded articles from the mold cavities.
Figure 5:
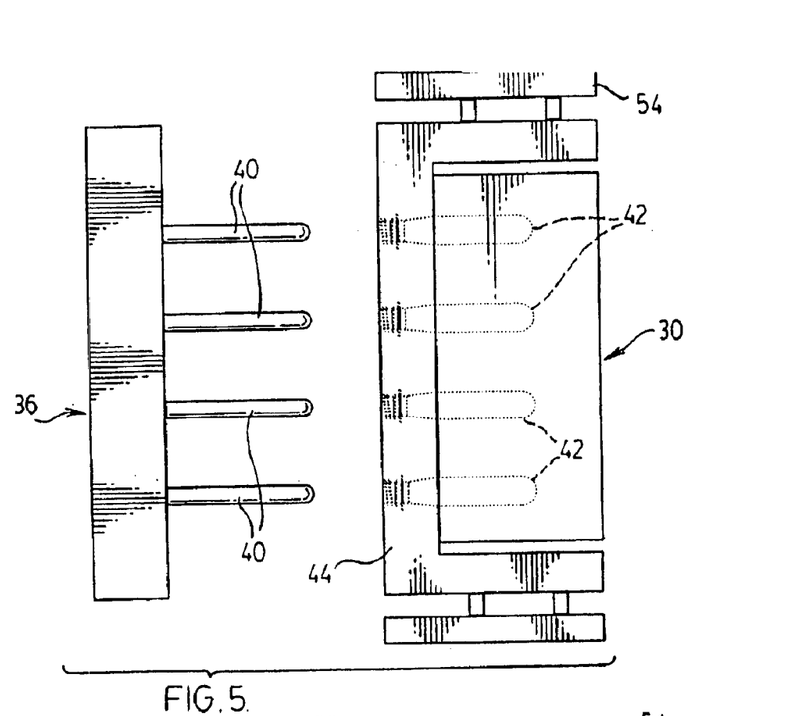
FIGS. 5 to 9 are side elevational views of the apparatus shown in FIGS. 2, 3 and 4, illustrating successive steps in the overall molding cycle.
Figure 6:
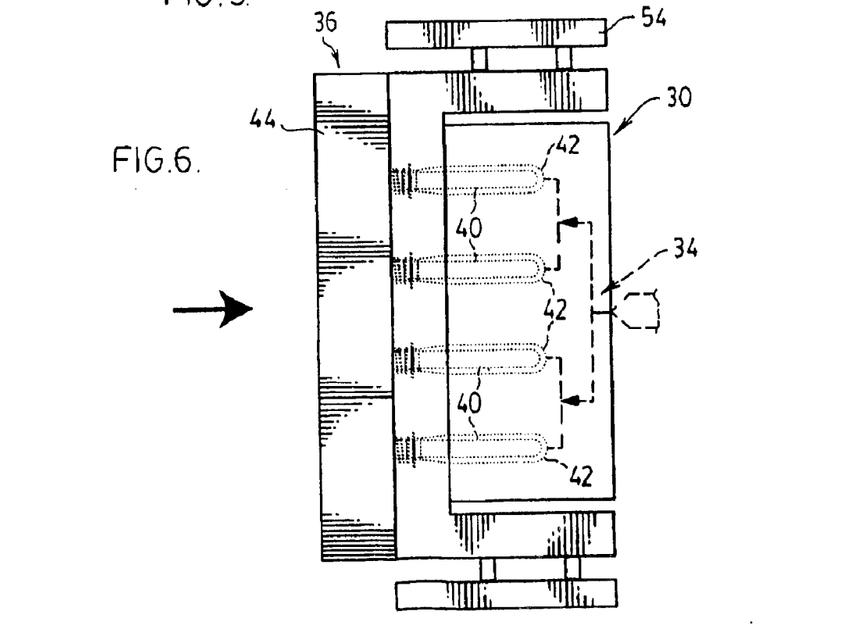

A mold core plate is generally indicated by reference numeral 36 in FIGS. 4, 5 and 6 and carries mold cores 40 in an array that corresponds to the array of cavities seen in FIG. 2. FIG. 5 shows the mold core plates in an open position prior to injection, in which the mold cores 40 are spaced from but aligned with the mold cavities. FIG. 6 shows the mold core plates in a closed position in which the mold cores 40 are received within the mold cavities (denoted 42) ready for injection of molten plastic material.

In a conventional injection molding machine used for making preforms, the threads 26 and annular flange 28 of the preform (FIG. 1) are formed by so-called "neck rings" that are carried by the core plate 36. Each ring is made in two halves so that the ring can open to release the molded part at the end of the injection cycle.

In contrast, the corresponding mold elements are carried by the cavity plate 30 in the present invention. This differentiates the mold overall from the prior art. Thus, neck rings for forming the threads 26 and flanges 28 on the preform are incorporated in plates that are carried by the cavity mold plate 30. As seen in FIG. 2, the mold cavities are aligned in vertical rows represented by the openings that are denoted 32. Neck rings for forming the threads and flanges on the preforms made by each vertical row of cavities are incorporated into a pair of neck ring plates 44 that meet on a vertical line 46 that bisects the open ends 32 of the cavities. The two plates are formed with respective half-rings 48 that are aligned with the mold cavities and the plates are movable between the closed positions in which they are seen in FIG. 2 during molding, and open positions in which the plates are spaced apart and moved outwardly away from the cavity mold plate 30 as shown in FIG. 3.

Figure 3:
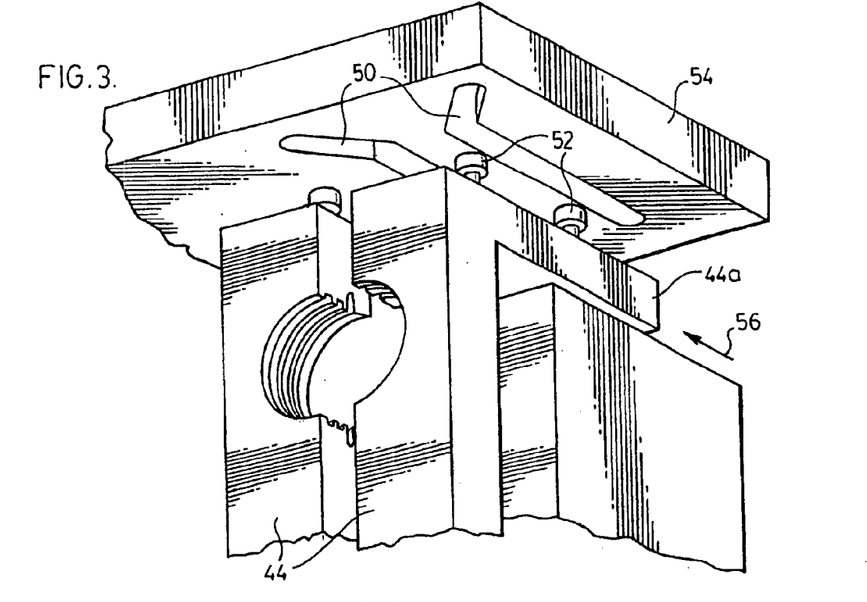
FIG. 3 is a detail perspective view of part of FIG. 2 showing components of the cavity mold plate in an open position for release of a preform.

This movement of the neck ring plates 44 is accomplished by providing appropriately shaped cam tracks shown at 50 in FIG. 3 that co operate with corresponding followers 52 carried by rearward extensions 44a of the neck ring plates 44. The cam tracks 50 are formed in a stationary plate 54 above and at right angles to the neck ring plates 44. Actuators (not shown) are provided for displacing the neck ring plates 44 outwardly in the directions indicated by arrow 56 in FIG. 3 (and back) at appropriate times, to cause the required outward displacement and separation of the neck ring plates 44. It will be seen from FIG. 2 that a corresponding set of cams and cam tracks are provided on a plate 58 below the cavity mold plate 30. A corresponding set of actuators (also not shown) are provided in association with a rearward extension 44b at the bottom of each neck ring plate 44.

Figure 3A:
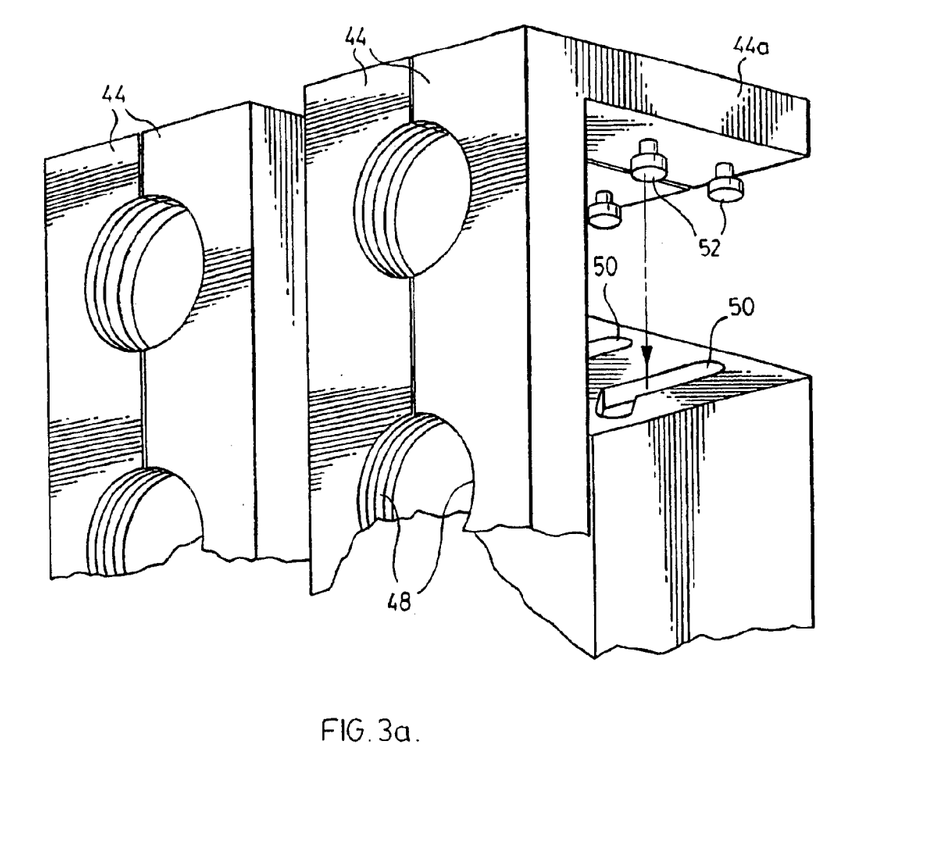
FIG. 3a is a view similar to FIG. 3 illustrating an alternative embodiment.

FIG. 3a illustrates an alternative embodiment in which the cam tracks 50 (and the corresponding cam tracks at the bottom of the cavity mold plate) are incorporated into top and bottom faces of the cavity mold plate and co-operate with followers 52 on the underside of the rear extensions 44a and 44b of the neck ring plates.

Reverting to FIG. 6, the neck ring plates 44 are of course in the closed position shown in FIG. 2 during injection of molten plastic material into the mold cavities 42. Once the cavities have been filled with molten plastic material, the mold is opened. Core plate 36 moves back to the position shown in FIG. 5, withdrawing the mold cores 40 from the mold cavities and leaving the molded articles within the cavity mold plate 30. In accordance with the method of the invention, a series of cooling cores carried by a take-out plate are then interposed between the two mold plates and the molded articles are transferred directly to the cooling cores.

Figure 7:
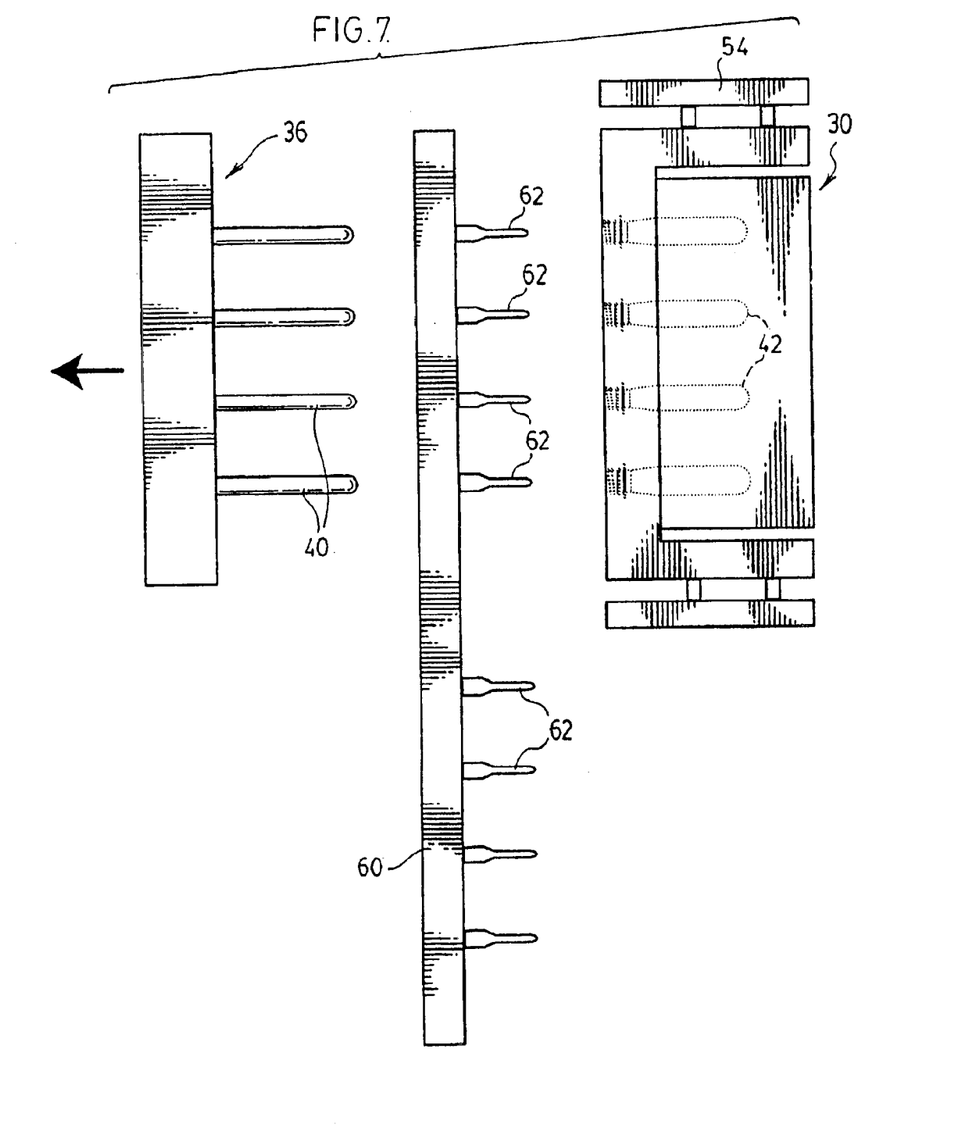

FIG. 7 shows a take-out plate 60 carrying cooling cores 62 positioned between the open mold plates, ready to receive the molded articles. In the illustrated embodiment, there are in fact two sets of cooling cores and the take-out plate 60 is carried by a robot arm 64 so that the take out plate can be manipulated to receive two sequential batches of molded articles, one of which can be cooling while the second set of cooling cores receives a second batch of freshly molded articles. FIG. 4 shows schematically the robot arm 64 and the two sets of cooling cores 62 that are carried by plate 60. FIG. 4 also makes it clear that each set of cooling cores includes one core for each of the mold cavities. In practice, the two sets of cores normally will be interlaced on plate 60 rather than in two separate sets.

Figure 8:
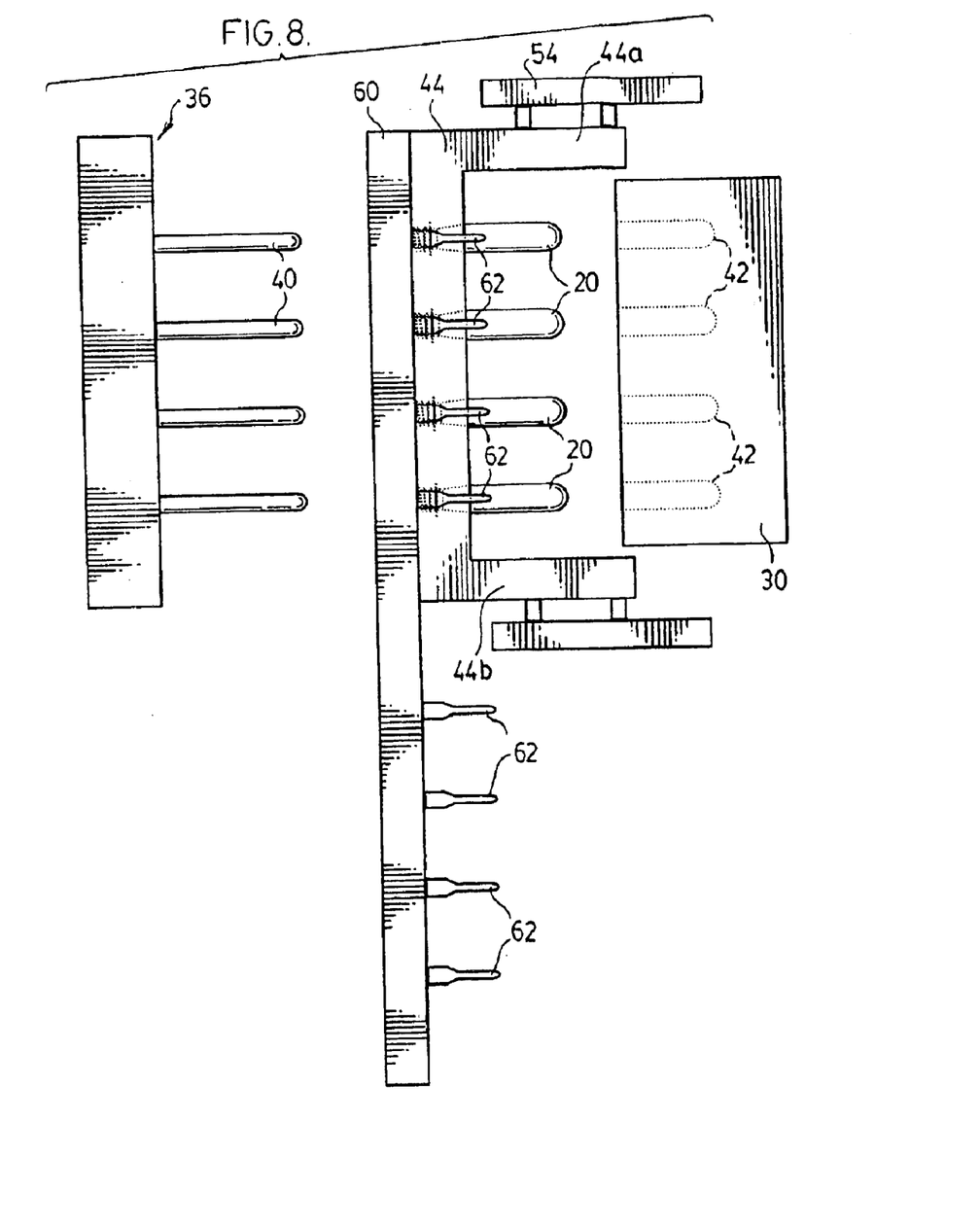
Figure 9:
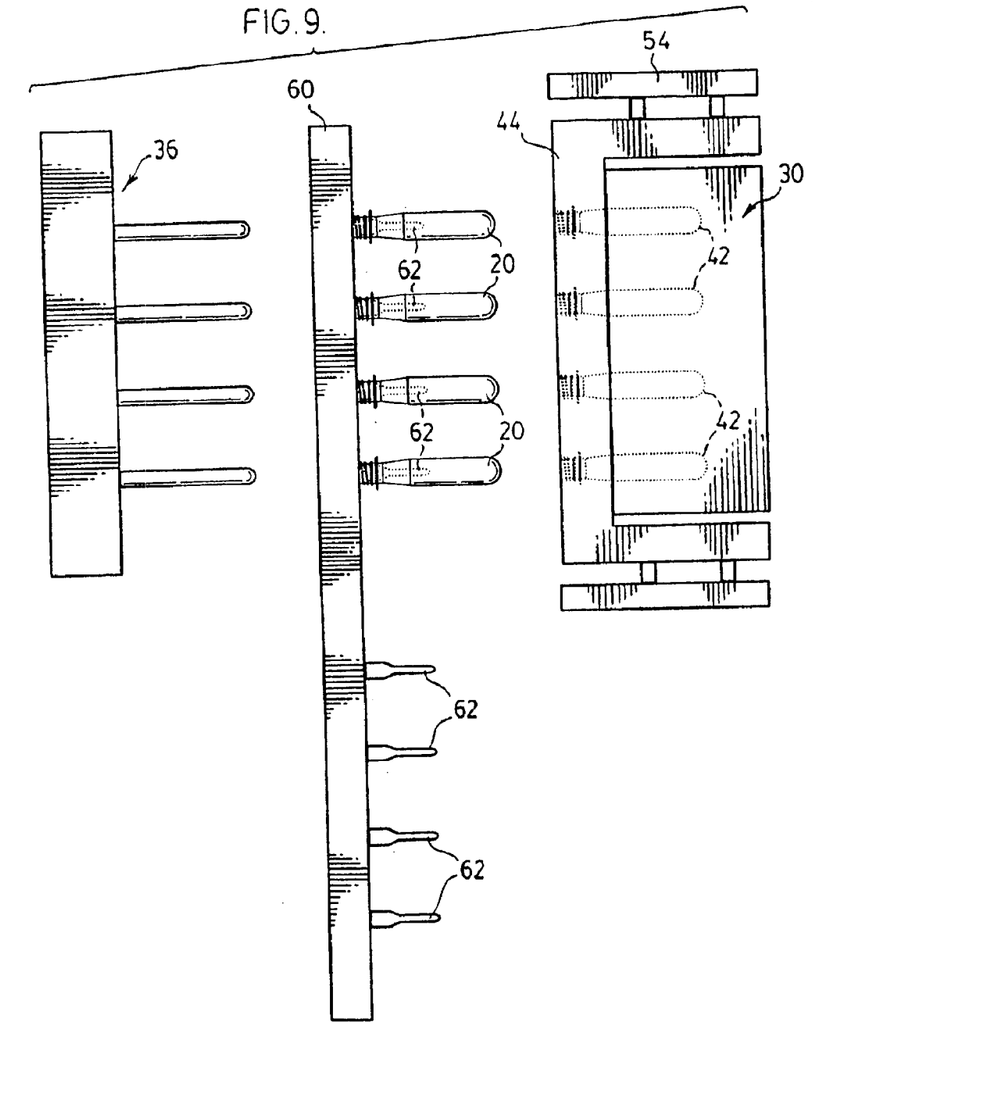

FIGS. 8 and 9 illustrate the step of transferring the freshly molded preforms to the cooling cores 62. As seen in FIG. 8, the two neck ring plates 44 have been moved under the control of the cam tracks 50 and 52 (FIG. 3) to advanced positions for transferring the preforms 20 onto the cooling cores 62. As described in connection with FIG. 3, the neck plates 44 not only move outwardly away from the cavity mold plate 30, but also move apart so that the preforms are released after having been positioned on the cooling cores 62. The neck ring plates 44 are then retracted to the position shown in FIG. 2. FIG. 9 shows the components of the molding apparatus with the freshly molded preforms 20 positioned on the cooling cores 62 and the neck ring plates 44 retracted.

Figure 10:
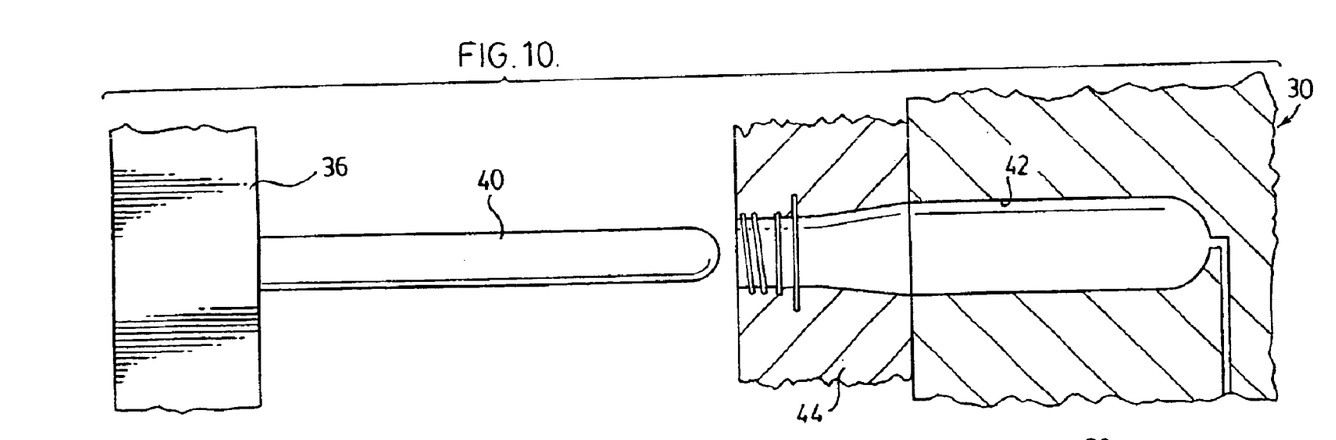
FIGS. 10 to 14 illustrate successive steps involved in molding an individual preform.
Figure 11:
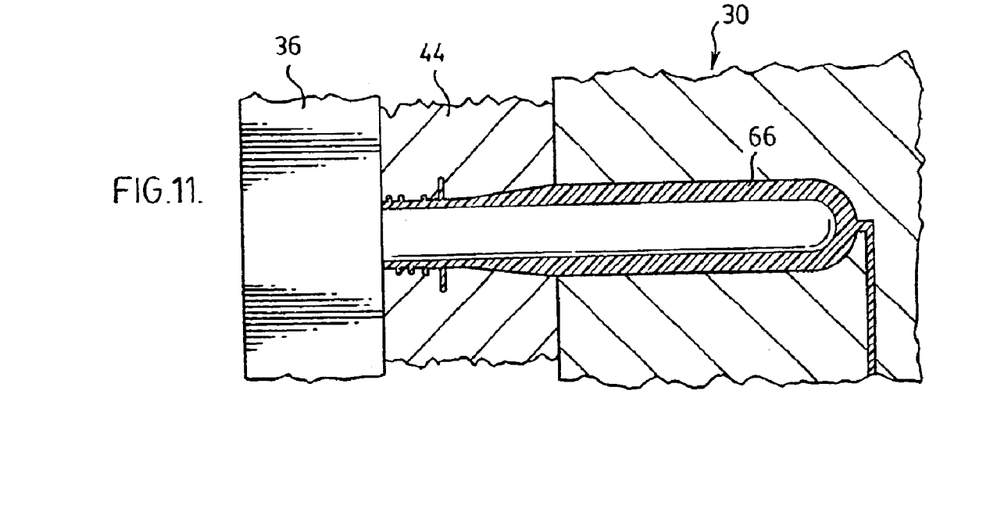

FIGS. 10 to 14 illustrate the steps of transferring the molded preforms onto the cooling cores with reference to a single preform. FIG. 10 shows one of the molding cores 40 entering a corresponding mold cavity 42. FIG. 11 shows the mold plates closed with the core plate 36 in contact with the neck ring plates 44 and plastic material having been injected into the mold cavity as indicated at 66.

Figure 12:
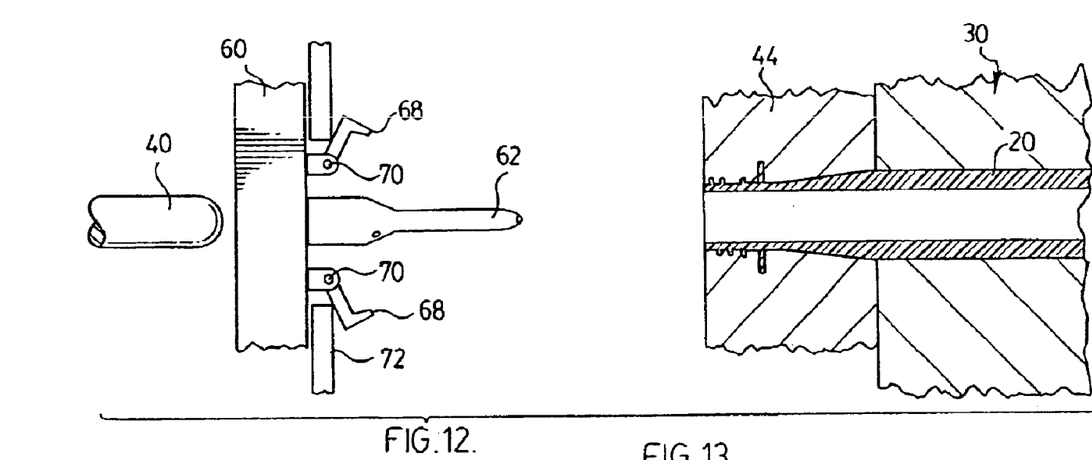
Figure 13:
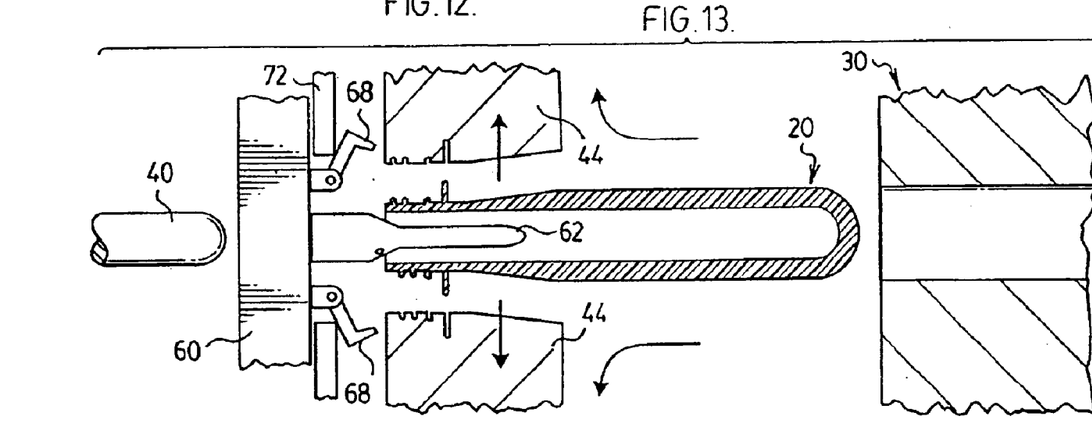
Figure 14:
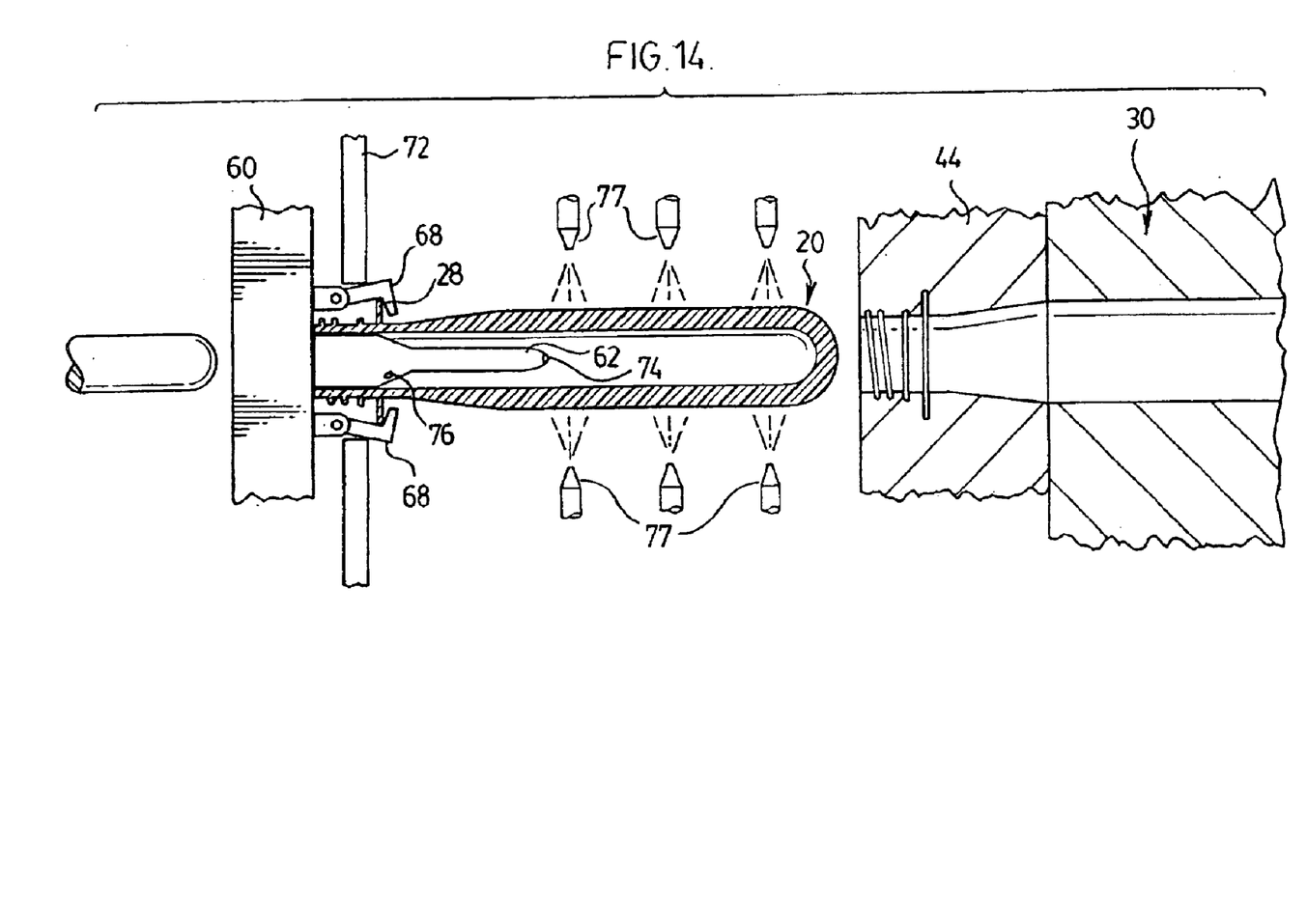

FIG. 12 shows the mold plates open with core plate 36 retracted to the left and the take-out plate 60 positioned between the mold plates as shown in FIG. 9. In FIG. 13, the neck ring plates 44 have been advanced to transfer the molded preform onto the cooling core 62, and have moved apart to release the preform. As seen in FIG. 14, the neck ring plates 44 have been retracted to the position shown in FIG. 9.

The take-out plate 60 is provided with means for retaining the molded preforms on the cooling cores 62. FIGS. 12 to 14 illustrate one possible form that these means may take. As shown in those views, the take-out plate 60 carries, adjacent each cooling core, a pair of gripper arms 68 that are pivotally coupled to the take-out plate 60 at their inner ends, as indicated at 70. The arms 68 are spring-biassed to the retracted positions in which they are shown in FIG. 12 and the take-out plate 60 is provided with an actuator plate 72 that can be moved outwardly with respect to the take-out plate to move the arms 68 inwardly against the spring biassing effect. Appropriate actuators (not shown) are provided on the take-out plate 60 for displacing plate 72.

As seen in FIG. 13, the gripper arms 68 are in their outwardly biassed positions and the preform 20 has just been released by the neck ring plates 44 onto the core 62. Plate 72 is then moved outwardly as shown in FIG. 14 to pivot the arms 68 inwardly and engage the annular ring 28 of the preform, drawing the preform onto the cooling core 62. When the preform has been cooled and is to be released, plate 72 is simply returned to its rest position, allowing the arms 68 to open under the effect of their spring-biassing, and release the preform. Robot 64 may invert the cooling cores so that the preforms will be stripped from the cores by gravity. Alternatively, an air jet may be used to blow the preform off the cooling core. Typically, air or other fluid will be used to internally cool the preform so the core 62 will be provided with an air outlet and a return, as indicated by way of example at 74 and 76 respectively in FIG. 14.

External jets of air or other fluid for cooling the performs are shown schematically at 77 and may be used in combination with or separately from internal cooling means.

Alternative means for retaining the preforms on the cooling cores may comprise neck ring plates similar to the plates 44 but carried by the take-out plate 60, for engaging the preforms after they have been placed on the cooling cores and then releasing the preforms after cooling.

Figure 15:
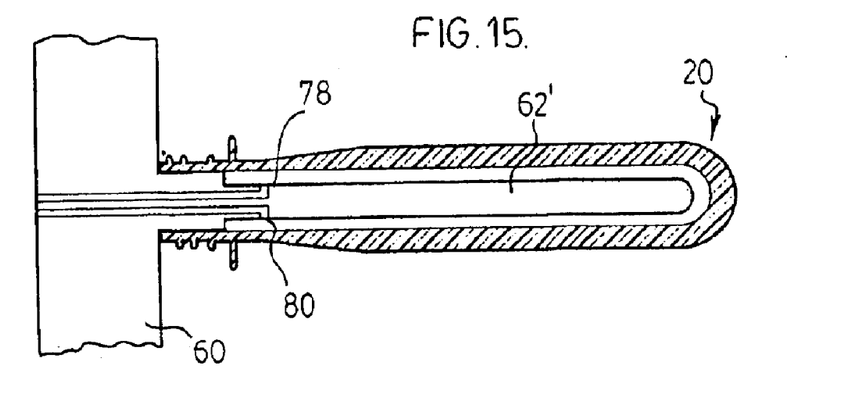
FIGS. 15, 16 and 17 are sequential views illustrating an alternative embodiments of cooling core; and, FIG. 18 is a view illustrating an embodiment of the invention in which the molded articles are blow molded immediately following injection molding.

Another possibility is to use suction to draw the preform onto the cooling core, and hold the cooling core in place, either by suction alone or in combination with a mechanism such as the gripper arms 68 referred to previously. FIG. 15 shows one form of cooling core, 62', that is provided with both a suction port 78 for drawing the preform onto the core and a pressure port 80 for directing cooling air into the preform.

Figure 16:
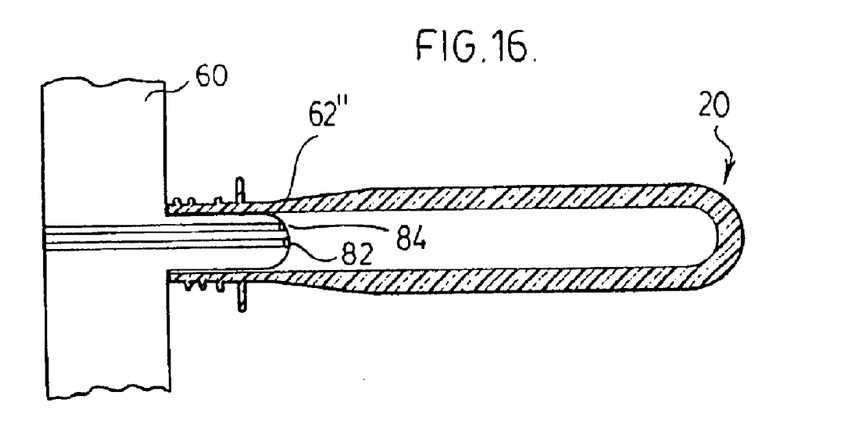
Figure 17:
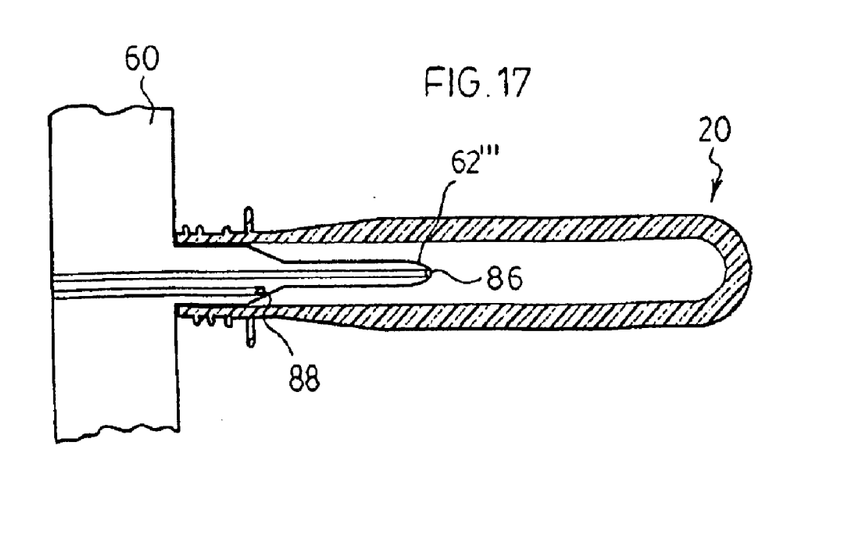

FIG. 16 shows a further alternative form of cooling core, denoted 62" having air outlet and return ports 82 and 84 respectively for cooling the preform. FIG. 17 shows a still further form of cooling core, denoted 62'" having air outlet and return ports 86, 88 respectively through which air can be directed to blow the cooled preform off the core.

Figure 18:
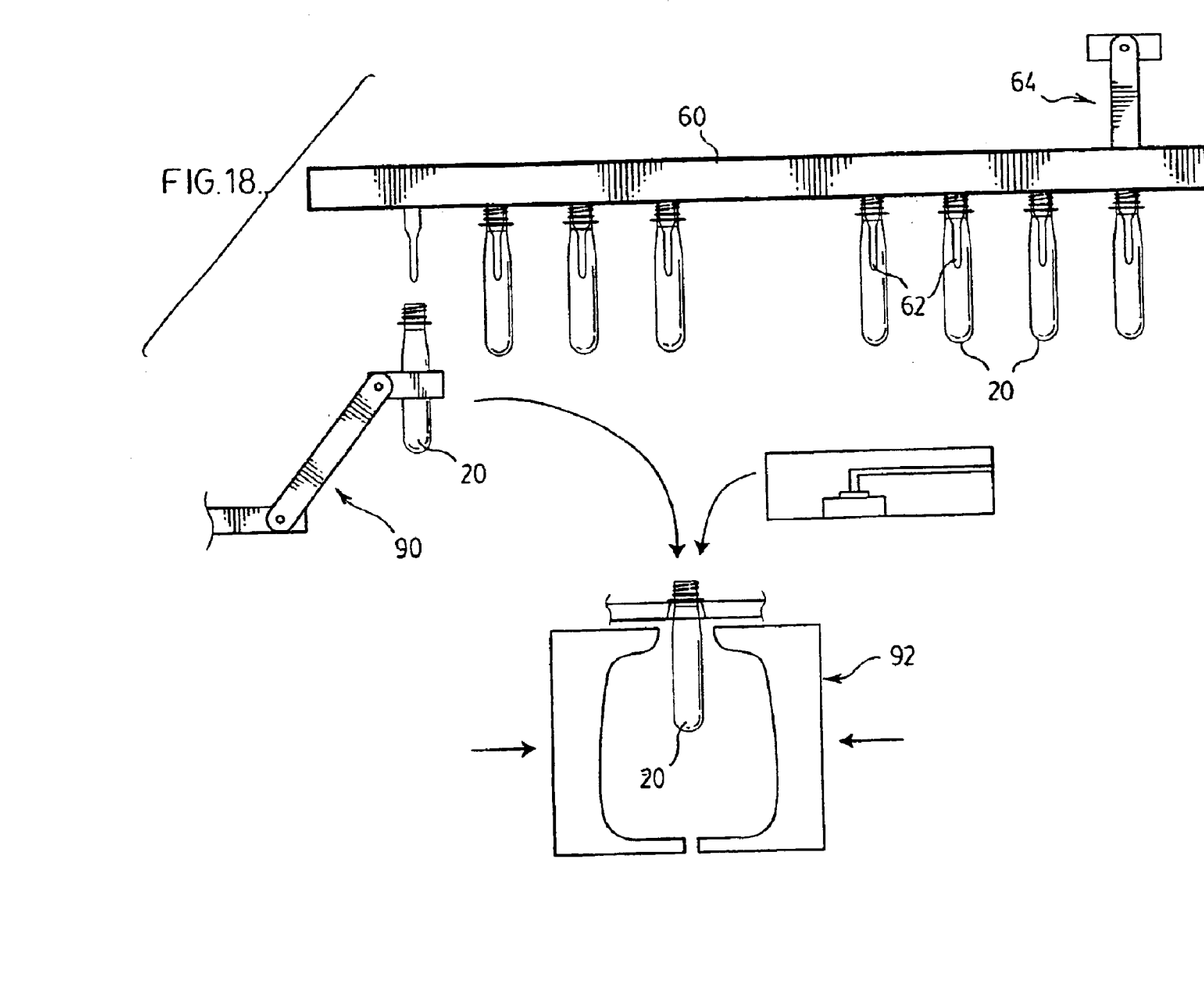

Finally, FIG. 18 shows an embodiment in which molded preforms 20 are removed from the take-out plate 60 by a further robot arm 90 and then placed directly in a blow molding machine 92 for forming the preforms into bottles. In this case, the preforms will not normally be cooled. In other words, the apparatus performs a take-out function without active cooling.

Broadly speaking (not only in the embodiment of FIG. 18), the cores may function generally as "retaining" or "transfer" cores having no active cooling function.

The retaining cores may be made of a thermally conductive material (e.g. aluminum) for passively cooling the molded articles.

The invention may be carried on using any known injection molding machine having an injection unit to provide moldable material under pressure to a mold cavity space formed between a mold core and a mold cavity. Any known machine clamp unit is used to maintain a mold cavity plate and a mold core plate in contact and in a closed position during the injection process.

In one embodiment, the take-out plate comprises retaining cores to hold the molded articles transferred directly from the injection mold cavities. The retaining cores are made of any suitable material. In one instance the retaining cores have an inner diameter that allows the core to make contact with the molded article. In this case, the core may be made of a thermally conductive material that allows the heat transfer from the article to the core. Therefore the cores may be made of steel, steel alloys, aluminum or aluminum alloys, copper and copper alloys and other materials.

It will of course be understood that the preceding description relates to particular preferred embodiments of the invention only and that many modifications are possible within the broad scope of the invention, some of which have been indicted and others of which will be apparent to a person skilled in the art. It should be noted in particular that the precise expedients that are used for transferring the freshly molded preforms from the mold cavities to the cooling cores are given by way of example only and may vary. Also, while reference is made specifically to bottle preforms (i.e. an intermediate product), it is to be understood that the method and apparatus of the invention may be applied to the cooling of finished molded articles.

What is claimed is:

1. A method for post-mold cooling of injection molded articles having neck regions comprising the steps of:
   (a) providing a molding system which includes a mold cavity plate having a plurality of injection cavities, a mold core plate having a corresponding plurality of injection cores receivable in the cavities for forming a plurality of molded articles, and neck ring plates associated with said cavity plate;
   (b) with the mold plates in a closed position, injecting plastic material into the mold cavities to form the molded articles;
   (c) separating the mold plates while retaining the molded articles in the injection cavities;
   (d) providing a take-out plate having retaining cores;
   (e) positioning the take-out plate between the cavity plate and the core plate;
   (f) using said neck ring plates to transfer the molded articles directly from the injection cavities onto the retaining cores by displacing the neck ring plates outwardly of the cavity plate so as to position the molded articles over the retaining cores, and releasing the molded articles from the neck ring plates; and
   (g) cooling the molded articles on said retaining cores.

2. The method as claimed in claim 1, wherein step (g) includes actively cooling the molded articles by directing cooling fluid against the articles while they are on the retaining cores.

3. The method as claimed in claim 1, wherein step (g) includes actively cooling the molded articles by directing cooling fluid through the retaining cores to internally cool the molded articles.

4. The method as claimed in claim 1, further comprising the step of positively retaining the molded articles on the retaining cores during cooling of the articles and then releasing the articles for stripping from the cores.

5. The method as claimed in claim 4, wherein stripping of the molded articles from the cores is effected by directing fluid internally into the molded articles through the cores.

6. An injection molding apparatus comprising:
   a mold including a mold cavity plate having a plurality of injection cavities and a mold core plate having a corresponding plurality of injection cores receivable in the cavities for forming a plurality of articles, the mold plates being movable between open and closed positions, and an assembly of neck ring plates associated with said cavity plate for forming neck regions of the molded articles;
   a take-out plate including a plurality of retaining cores corresponding to said plurality of cavities;
   means for positioning said take-out plate between said mold plates when the mold plates are in said open position; and,
   wherein said neck ring plates are movable outwardly from the mold cavity plate for transferring molded articles from said cavities directly to said retaining cores and being adapted to release the molded articles onto said retaining cores.

7. The apparatus as claimed in claim 6, further comprising means for directing fluid against said molded articles while said articles are on the retaining cores, for cooling the molded articles.

8. The apparatus as claimed in claim 6, wherein said retaining cores include internal passageways through which fluid can be directed internally of the molded articles for cooling.

9. The apparatus as claimed in claim 6, wherein said neck ring plates are arranged in pairs of plates that meet on a part line aligned with a row of cavities in said mold cavity plate, the neck ring plates in each pair being movable with respect to one another between a closed position for forming said neck regions, and an open position for releasing the molded articles, and said pair of plates being movable between a molding position adjacent said mold cavity plate for forming neck regions of the molded articles, and a position in which the
   neck ring plates are displaced outwardly from the mold cavity plate for releasing the molded articles onto the retaining cores.

10. The apparatus as claimed in claim 6, further comprising means for retaining the molded articles on the retaining cores for cooling, said retaining means being adapted to release the molded articles for stripping from said cores.

11. The apparatus as claimed in claim 10, wherein said retaining means comprises suction means for drawing the preforms onto the retaining cores.

12. The apparatus as claimed in claim 10, wherein said retaining means comprises gripper arms carried by the take-out plate for retaining the molded articles on the cooling cores, said gripper arms being displaceable to release the molded articles for stripping from said cores.

13. The apparatus as claimed in claim 6, further comprising means for stripping the molded articles from the retaining cores comprising air passageways in the cooling cores and means for directing air flow along said passageways to strip the molded articles from the retaining cores.

14. The apparatus as claimed in claim 6, wherein the retaining cores are made of a thermally conductive material for passively cooling the molded articles.

* * * * *